US008639115B2

(12) United States Patent
     Mazed

(10) Patent No.: US 8,639,115 B2
(45) Date of Patent: Jan. 28, 2014

(54) TIME AND WAVELENGTH-SHIFTED DYNAMIC BIDIRECTIONAL SYSTEM

(75) Inventor: Mohammad A. Mazed, Yorba Linda, CA (US)

(73) Assignee: Dorica Properties NY LLC, Wilmington, DE (US)

( * ) Notice: Subject to any disclaimer, the term of this patent is extended or adjusted under 35 U.S.C. 154(b) by 280 days.

(21) Appl. No.: 12/907,750

(22) Filed: Oct. 19, 2010

(65) Prior Publication Data

US 2011/0033185 A1    Feb. 10, 2011

Related U.S. Application Data

(63) Continuation of application No. 11/483,010, filed on Jul. 6, 2006, now Pat. No. 7,831,146.

(60) Provisional application No. 60/717,232, filed on Sep. 15, 2005.

(51) Int. Cl.
    *H04J 14/00*    (2006.01)
(52) U.S. Cl.
    USPC .................................. 398/47; 398/52; 398/75
(58) Field of Classification Search
    USPC ..................... 398/66–77, 47, 52–54
    See application file for complete search history.

(56) References Cited

U.S. PATENT DOCUMENTS

| | | | | |
|---|---|---|---|---|
| 5,930,015 A | * | 7/1999 | Yamamoto et al. | 398/71 |
| 2002/0053677 A1 | * | 5/2002 | Sarathy et al. | 257/98 |
| 2005/0259989 A1 | * | 11/2005 | Sorin et al. | 398/79 |
| 2006/0140631 A1 | * | 6/2006 | Brolin | 398/79 |
| 2006/0228113 A1 | | 10/2006 | Cutillo et al. | |
| 2007/0019956 A1 | | 1/2007 | Sorin et al. | |

* cited by examiner

*Primary Examiner* — Dzung Tran

(57) ABSTRACT

A bidirectional optical network, in which an incoming/downstream modulated optical signal(s) of a particular wavelength may carry content from a headend to a subscriber. An incoming/downstream unmodulated continuous wave optical signal(s) from the headend is time-shifted (i.e., time delayed with respect to just received incoming/downstream optical signal(s)), collected, modulated and sent back as return/upstream optical signal(s) from the subscriber to the headend. The return/upstream optical signal(s) may have the same wavelength or a slightly shifted wavelength relative to incoming/downstream optical signal(s). Wavelength, bandwidth, subscriber priority and service (content) provider may be fixed, dynamically, or statistically assigned. A modulated marker optical signal(s) is sent along with a modulated data optical signal simultaneously in a different plane. The modulated data optical signal(s) can therefore be securely delivered to a subscriber(s) according to the marker identification. Furthermore a device can be constructed from a group of components comprising an integrated tunable laser-modulator, a wavelength converter, a cyclic arrayed waveguide grating router, a photonic bandgap cyclic arrayed waveguide grating router, a burst enabled detector in order to electro-optically connect network elements, processors and chipsets on a printed circuit board.

7 Claims, 4 Drawing Sheets

TIME AND WAVELENGTH-SHIFTED DYNAMIC BIDIRECTIONAL SYSTEM

CROSS REFERENCE TO RELATED APPLICATION

This is a continuation of application Ser. No. 11/483,010, filed Jul. 6, 2006, which claims the benefit of U.S. Provisional Application No. 60/717,232, filed Sep. 15, 2005.

BACKGROUND OF THE INVENTION

1. Field of the Invention

The present invention relates to a dynamic bidirectional optical network. In particular, the present invention relates to a metro-access optical network.

SUMMARY OF THE INVENTION

The present invention illustrates a time- and wavelength-shifted bidirectional optical network in which an optical signal(s) of a wavelength(s) is propagated. This wavelength(s) may be fixed, dynamically or statistically assigned. This optical signal(s) may carry service or content (for example, voice, video and data) from a headend to a subscriber (for example, home or business).

According to one embodiment, the optical signal(s) of a particular wavelength ("incoming/downstream optical signal") is time-shifted at a subscriber (i.e., time delayed with respect to the incoming/downstream optical signal(s) from the headend), and reflected/sent back as a return/upstream optical signal(s) from the subscriber to the headend either having the same or slightly shifted wavelength with respect to the wavelength of the incoming/downstream optical signal. Such a time- or wavelength-shifted dynamic bidirectional optical network may be configured in a tree, a ring, or a star topology.

The present invention is better understood upon consideration with the accompanying drawings.

DETAILED DESCRIPTION OF THE PREFERRED EMBODIMENTS

Figure 1:
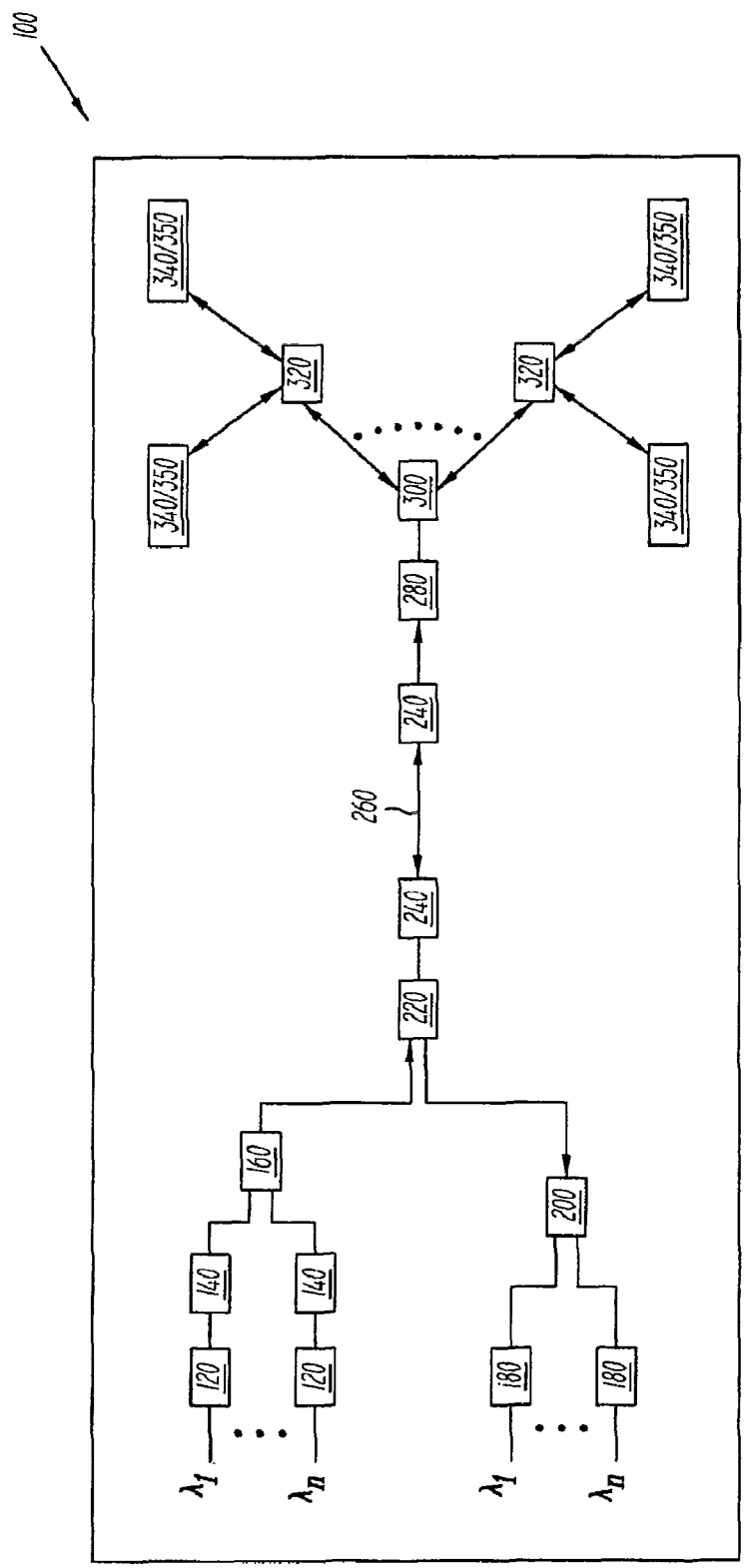
FIG. 1 describes a time- or wavelength-shifted dynamic bidirectional optical network 100 in accordance with one embodiment of the present invention.

As described in FIG. 1, at a headend, one or more fast switching tunable laser(s) 120 (preferably, bursty emission-enabled laser with a low coherence length), having many switched wavelengths is externally modulated by a modulator(s) 140 during statically, dynamically or statistically assigned time slots to transmit a modulated optical signal(s). For a shorter reach, the fast switching tunable laser(s) 120 may be internally modulated rather than externally modulated by external modulator(s) 140. Any modulation format may be used, for example but not limited to an optical intensity modulation. At other times, fast switching tunable laser(s) 120 may transmit an unmodulated continuous wave optical signal(s). The output optical signal(s)—modulated optical signal(s) as well as unmodulated continuous wave optical signal(s) from modulator(s) 140—is combined by a wavelength combiner 160 (preferably, low cross-talk and low-loss) before being transmitted via circulator 220 (or any suitable optical power splitter) and amplified using an optical amplifier 240 (remotely optically pumped, if needed) onto an optical fiber, such as single-mode holey optical fiber 260 or any suitable guided conduit for light propagation.

Optical fibers in a ring network topology may be connected via an optical switch 280 to form a protection path, so as to avoid service interruption resulting from a failure in an optical fiber.

An integrated wavelength combiner/decombiner 300 (e.g., an arrayed waveguide grating router; preferably, low-crosstalk and low-loss) combines or divides the optical signal(s) to and from subscriber subsystem(s) 340 or 350, either directly or through one or more optional integrated optical power/wavelength/polarization combiner/decombiners 320. An integrated optical power/wavelength/polarization combiner/decombiner 320 can be utilized to combine or divide the optical signal(s), on a power, wavelength or polarization basis, to a plurality of subscriber subsystems 340 or 350.

In one embodiment, the wavelength assigned to subscriber subsystem(s) 340 or 350 may be fixed. In another embodiment, the wavelength assigned to a subscriber subsystem(s) 340 or 350 may be dynamically or statistically varied. The headend thus sends both modulated optical signal(s) and unmodulated continuous wave optical signal(s) during a set of fixed, dynamically or statistically assigned time slots utilizing a suitable centralized or distributed algorithm (e.g., a mathematical algorithm) with or without regard to priority to any subscriber subsystem 340 or 350, class of service (e.g., voice, video or data) or service/content providers. Such an algorithm may take into account synchronization time, propagation time, switching time from modulated optical signal(s) to unmodulated continuous wave optical signal(s), downstream (from a headend to a subscriber) content delivery time, upstream (from a subscriber to a headend) content delivery time, subscriber-to-subscriber switching/guard time, priority according to a subscriber, a class of service or a service/content provider, an identification, and a fairness constraint. The unmodulated continuous wave optical signal(s) from fast switching tunable laser(s) is provided by a headend to a subscriber subsystem 340 or 350 so as to allow a subscriber subsystem 340 or 350 to reflect, modulate, or send back a return/upstream optical signal(s) to the headend with an added chirp (for example, random pilot tone modulation) at a subscriber subsystem 340 or 350 to broaden the linewidth of a return/upstream optical signal(s) with a very careful attention to an eye-pattern.

The return/upstream optical signal(s) from a subscriber subsystem 340 or 350, is sent through a circulator 220 to a decombiner 200 (preferably, low cross-talk and low-loss), where the wavelengths are separated, received and detected by tunable photodiodes 180. Tunable photodiode(s) 180 (preferably bursty detection enabled) converts the optical signals into electrical signals for further electrical processing.

Figure 2:
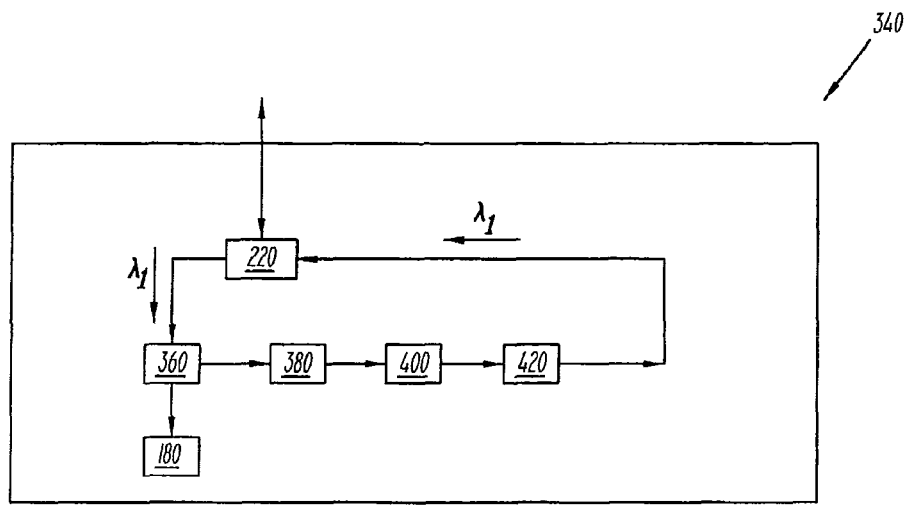
FIG. 2 describes multiple optical signal processing functions in a subscriber subsystem 340, according to one embodiment of the present invention.

FIG. 2 describes multiple optical signal processing functions in a subscriber subsystem 340. According to one embodiment of the present invention, modulated optical signal(s) received by at circulator 220 (or any suitable optical power splitter) is sent to a programmable optical power splitter 360, which splits optical power according to a variable ratio. The programmable optical power splitter 360 sends the modulated optical signal(s) to tunable photodiode(s) 180. This modulated optical signal(s) is received and detected by tunable photodiode(s) 180, which converts the optical signals detected into electrical signal(s) for further processing.

At other time slots, unmodulated continuous wave optical signal(s) received by circulator 220 is sent from programmable optical power splitter 360 to be amplified by an optical amplifier 380, modulated by modulator 400 and filtered by noise reduction filter 420 (for example, a ring resonator). These components collectively create the return/upstream optical signal(s) to the headend.

Figure 3:
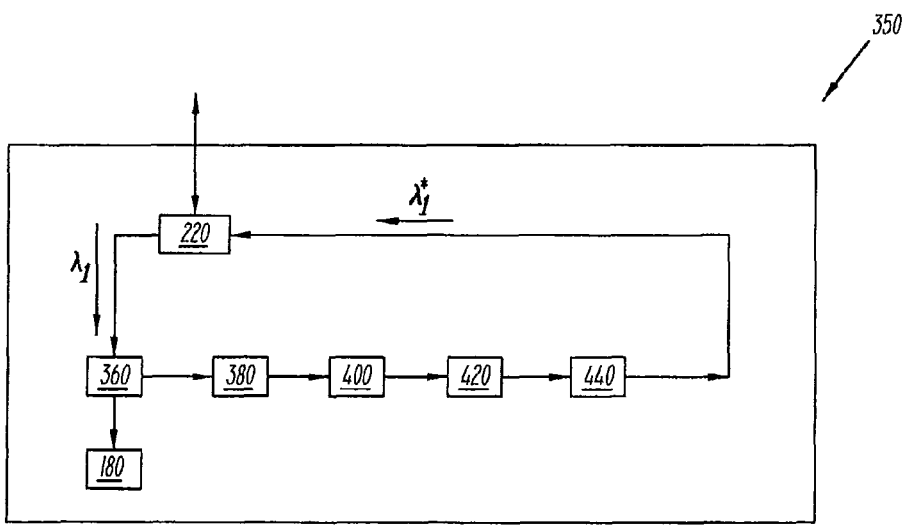
FIG. 3 describes a wavelength conversion, an optical signal processing function (in addition to previous multiple optical processing functions) in a subscriber subsystem 350, according to another embodiment of the present invention.

FIG. 3 describes a variation in optical signal processing functions in a subscriber subsystem 350, according to another embodiment of the present invention. Referring to FIG. 3, subscriber subsystem 350 differs from a subscriber subsystem 340 by an addition of a fast switching tunable wavelength shifter 440 (for example, a fast switching wavelength converter), which slightly shifts the received wavelength of a incoming/downstream optical signal(s) from $\lambda_1$ nm to $\lambda_1^*$ nm, before defining a return/upstream optical signal(s) to the headend.

To prevent any undesirable effects of background noise, optical amplifier 380 and the tunable photodiode 180 within a subscriber subsystem(s) 340 or 350 may be rapidly turned on only when they are processing optical signal(s); otherwise, both the optical amplifier 380 and the tunable photodiode 180 may remain turned off within subscriber subsystem(s) 340 or 350.

A compact semiconductor optical amplifier may be utilized to further simplify an optical amplifier 380. A reflective mode semiconductor optical amplifier may be utilized. A field-effect semiconductor optical amplifier integrated with an electro-absorption or a Mach-Zander modulator may also be utilized. Semiconductor optical amplifier 380 may be an in-plane quantum dot-based or a vertical cavity quantum dot-based amplifier. A variable tunable optical attenuator may be utilized for output power-leveling in the return/upstream optical signal(s) from subscriber subsystem 340 or 350.

The entire subscriber subsystem 340 or 350 can be integrated as a system-on-a package or a system-on-a chip.

Referring again to FIG. 1, the return/upstream optical signal(s) from subscriber subsystem(s) 340 or 350 is transmitted via a single mode optical fiber 260, optical switch 280, and optical amplifier 240, and is received by a circulator 220 (or any suitable optical power splitter) during a set of fixed, dynamically or statistically assigned time slots. The return/upstream signal is then decombined or separated by a wavelength decombiner 200 (preferably, low-crosstalk and low-loss) and received and detected by tunable photodiode(s) 180.

In this manner, a standalone time-shifted or time- and wavelength-shifted bidirectional communication system is established.

Figure 4:
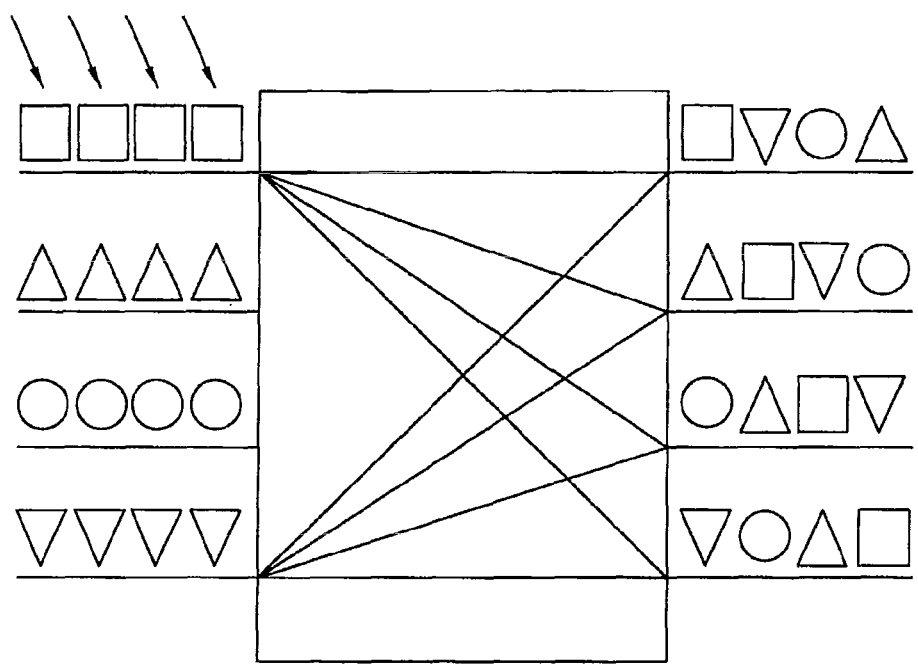
FIG. 4 describes a wavelength cyclic arrayed waveguide grating router 150, according to another embodiment of a time and wavelength shifted dynamic bidirectional optical network of the present invention.

According to another embodiment of the present invention, as shown in FIG. 4, a M number of fast switching tunable lasers 120, a M number of modulators 140 and a M number of fast switching tunable photodiodes 180 may be connected via a M number of circulators 220 (or any suitable optical power splitters) to a M inputs of a M (inputs):M (outputs) wavelength cyclic arrayed waveguide grating router 150 (preferably low-crosstalk and low-loss) at a headend.

As shown in FIG. 4, when light from fast switching tunable laser 120 or fast switching tunable wavelength shifter 440 (for example, a wavelength converter) is switched in time at a particular input of a M:M cyclic arrayed waveguide grating router, all possible switched output wavelengths of the fast switching tunable laser 120 or the fast switching tunable wavelength shifter 440 are arranged or displayed at the M outputs of the M:M cyclic arrayed waveguide router due to an unique free spectral range periodic property of the cyclic arrayed waveguide grating router. This offers a flexibility of routing more than one wavelength at any output.

Furthermore, each output of a M:M wavelength cyclic arrayed waveguide grating router 150 may be connected to a 1:N arrayed waveguide grating combiner/decombiner 300 and which, in turn, may be further connected to a 1:K integrated optical power/wavelength/polarization combiner/decombiner 320. However, both the M:M wavelength cyclic arrayed waveguide grating router 150 and 1:N arrayed waveguide grating combiner/decombiner 300 must match the bandpass wavelengths. Hence, the number of subscriber subsystems 340 or 350 that may be connected is the product of M, N and K (i.e., M times N times K). The actual residence time of a wavelength to a subscriber subsystem 340 or 350 may be statically, dynamically or statistically assigned. The fast switching tunable laser 120 or the fast switching tunable wavelength shifter 440, the M:M wavelength cyclic arrayed waveguide grating router 150 and the mathematical algorithm enable dynamic provision of wavelength, bandwidth, service or content, and service or content provider to a subscriber subsystem(s) 340 or 350.

Such a rapid wavelength routing (in space, wavelength and time) may be utilized as a dynamic optical packet router or as a dynamic optical interconnect between integrated circuits or microprocessors (i.e., "chip-to-chip" optical interconnect).

Figure 5:
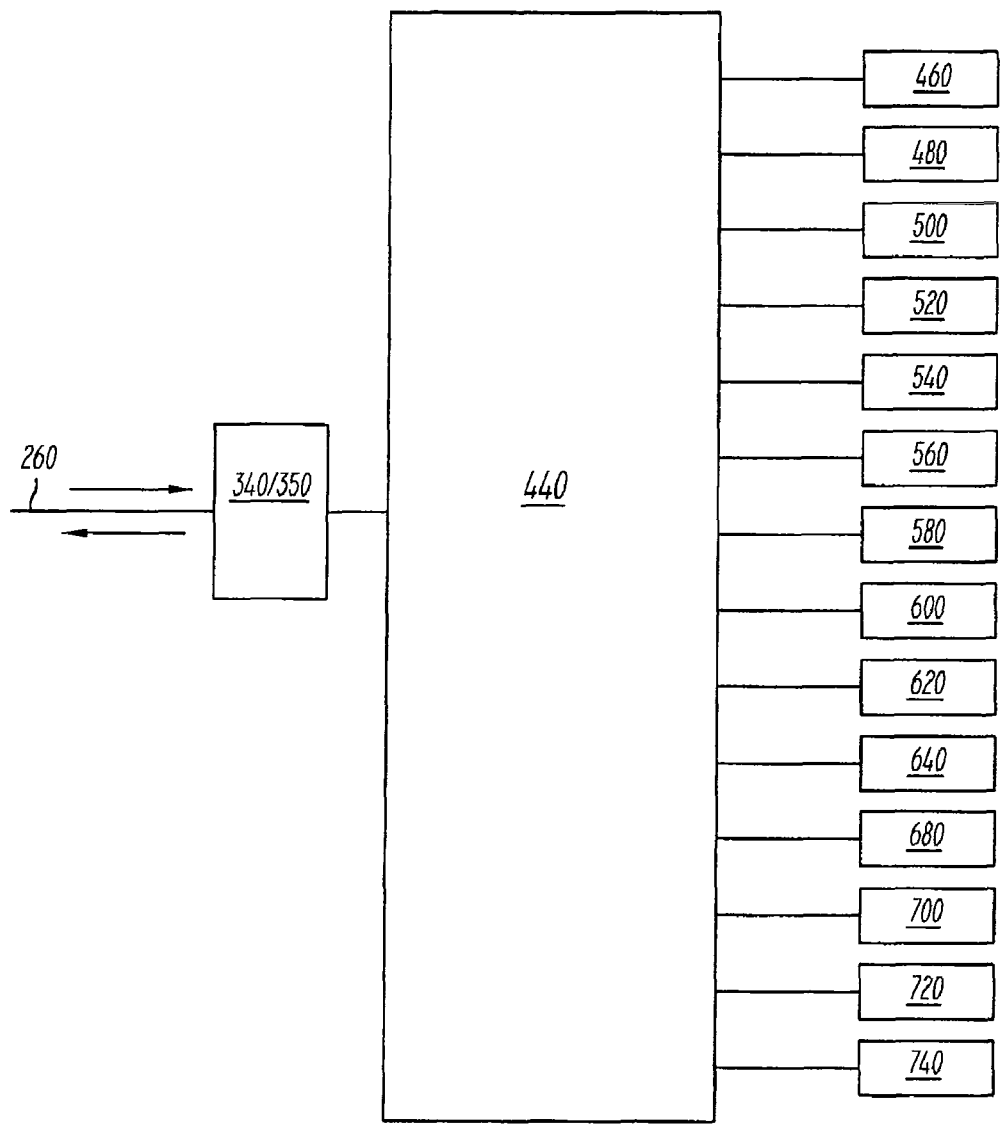
FIG. 5 describes a universal subscriber gateway related to a subscriber subsystem 340 or 350 according to another embodiment of the present invention.

FIG. 5 illustrates an implementation of a universal multi-function subscriber gateway with a subscriber subsystem 340 or 350, a FPGA, containing an embedded mathematical algorithm, and a processor or a microcontroller 440 interacting with various hardware or software for example, an authentication module 440, in-situ real-time diagnostic module 460, Internet firewall device 480, and Internet spyware firewall device 500. Communication functions may be carried out by a standard plain old telephony service (POTS) 520, a voice-over-Internet-based protocol service 540, a data processor 560, a communication-over-wireless (including a millimeter wave) service 580, a communication-over-coax service 600, and a communication-over-Cat 5 cable service 620. In addition, a video-over-Internet-based protocol to regular TV converter 640, set-top box 660, a video recorder 680, T-1 700, a smart home connection 720 and a wireless home sensor 740 may also be included. All functions mentioned above can be integrated into one or more application-specific integrated circuits.

According to another embodiment of the present invention, secure delivery of data optical signal(s) to an intended destination may be achieved using a low bit rate marker optical signal(s) which is modulated simultaneously at a different plane utilizing a different modulation format or scheme, in conjunction with a high bit rate optical data signal(s). The low bit rate marker optical signal(s) is extracted and converted from an optical domain to an electrical domain to determine the destination of the data optical signal(s), while the data optical signal(s) remains in the optical domain until it is delivered. In this manner, additional routing capability and security in data optical signal delivery are provided.

The above description is provided to illustrate specific embodiments of the present invention and is not intended to be limiting. Many variations and modifications within the scope of the present invention are possible. The present invention is set forth in the claims set forth below.

I claim:

1. A first device, comprising:
   a laser configured to generate an optical signal;
   a modulator configured to modulate the optical signal;
   wherein the first device is configured to:
   convey, to a second device, a modulated form of the optical signal during a first time slot;
   convey, to the second device, an unmodulated form of the optical signal during a second time slot, wherein the second device is configured to modulate and shift a wavelength of the unmodulated form of the optical signal; and
   receive the modulated and wavelength-shifted form of the optical signal reflected by the second device.

2. The first device of claim 1, further comprising:
   a photodiode configured to convert the modulated and wavelength-shifted form of the optical signal to an electric signal.

3. The first device of claim 2, wherein the photodiode is a tunable photodiode.

4. The first device of claim 2, further comprising:
   a plurality of photodiodes including the photodiode; and
   a wavelength decombiner configured to separate optical signals received via a single optical fiber;
   wherein the first device is configured to provide the separated optical signals to the plurality of photodiodes.

5. The first device of claim 1, further comprising:
   a plurality of lasers including the laser, wherein each of the plurality of lasers is configured to generate respective optical signals having different respective wavelengths;
   a wavelength combiner configured to combine the generated optical signals for transmission over a single optical fiber.

6. The first device of claim 1, further comprising:
   a circulator configured to facilitate bidirectional communication over an optical fiber, wherein the unmodulated and modulated forms of the optical signal correspond to a down stream signal in the bidirectional communication.

7. The first device of claim 1, wherein the first device includes a headend device configured to communicate with a plurality of subscriber devices including the second device, wherein the first device is configured to receive upstream optical signals from ones of the plurality of subscriber devices, wherein the upstream optical signals are generated by modulating the unmodulated form of the optical signal.

* * * * *